United States Patent [19]

Tripathi et al.

[11] Patent Number: 5,832,504

[45] Date of Patent: Nov. 3, 1998

[54] AUTOMATIC ENHANCED REPORT GENERATION SYSTEM

[75] Inventors: Amitabh Tripathi, Woodland Hills; Kenneth C. Haxton, Los Angeles; Kishor Patel, Rancho Palos Verdes, all of Calif.

[73] Assignee: Xerox Corporation, Stamford, Conn.

[21] Appl. No.: 684,988

[22] Filed: Jul. 22, 1996

Related U.S. Application Data

[63] Continuation of Ser. No. 237,578, May 3, 1994, abandoned.

[51] Int. Cl.[6] ............................................. G06F 17/30
[52] U.S. Cl. ........................ 707/104; 707/500; 707/529; 707/530; 707/531
[58] Field of Search .................................. 707/104, 500, 707/529, 530, 531

[56] References Cited

U.S. PATENT DOCUMENTS

| | | | |
|---|---|---|---|
| 4,417,322 | 11/1983 | Berry et al. | 364/900 |
| 4,688,195 | 8/1987 | Thompson et al. | 364/300 |
| 5,101,375 | 3/1992 | Goldhor | 364/419 |
| 5,168,548 | 12/1992 | Kaufman et al. | 395/2 |
| 5,228,116 | 7/1993 | Harris et al. | 395/54 |
| 5,297,249 | 3/1994 | Bernstein et al. | 395/156 |
| 5,423,033 | 6/1995 | Yuen | 395/600 |
| 5,465,378 | 11/1995 | Duensing et al. | 395/800 |

*Primary Examiner*—Thomas G. Black
*Assistant Examiner*—C. Lewis
*Attorney, Agent, or Firm*—Robert Cunha

[57] ABSTRACT

A system of creating enhanced reports from a computer database or programming language. The system will contain the basic data and some contextual information, which is the description of the type of information contained within the lists of the data file. The enhanced report generator will be sets of instructions which are loaded into the computer, each set of which will contain rules for formatting a report, based on the user inputs, the data, and the data's context. In the event that the context is not sufficient, additional contextual information will be loaded at the time that the enhanced report generator is loaded. The enhanced report generator will be loaded into the system in parallel with the standard report generator that is contained within the computer as a software application, and the user can select one, thus making the use of the enhanced reort generator transparent to the computer.

3 Claims, 3 Drawing Sheets

AUTOMATIC ENHANCED REPORT GENERATION SYSTEM

This is a continuation of application Ser. No. 08/237,578, filed May 3, 1994, abandoned.

BACKGROUND OF THE INVENTION

A method of efficiently producing a variety of output formats from information stored in a computer data base and more specifically, the provision of a transfer of the data to be presented (in hard copy such as printers, digital copiers and display or audio devices), and its context, to an additional enhanced report generator which processes the data in any one of a number of enhanced formatting software packages, the enhanced formatted result being transferred back to the output side of the standard report generator so that the process is transparent to the host.

In a typical installation, the information from a data base is accessed and sent to a standard report software package which will format the data according to its internal rules, the final result being sent to the output device. The standard report generator has its own features such as formatting, enhancements and exception reporting. Business applications written using a specific database language, such as Structured Query Language (SQL), Oracle or Sybase, as well as in computer programming languages such as C and Cobol, can be used to create a report. In the database, each file and each record format within each file is described in a header to identify the "context" of the associated information. Thus, a file may be a table of employee data, and the individual fields would be "name", "social security number", etc. This report generator, which now has all of the required information, will map the database fields to the actual data required, and produce the formatted report. The generator can also establish relationships among fields and predetermined data. For example, if a list of real property in California is to be prepared, then the program will search for the "CA" value in the "location" fields, to generate the report. If the application is written in a traditional language such as COBOL or C, the report mapping of data base field variables (such as location) to their particular values (such as California), can be done by the language itself, instead of by the database language.

The end product is a data report that is formatted and ready to be sent to the output devices such as printers or display devices. Report enhancement, to a form other than that determined by the report itself, is possible by providing additional post-processing, where the output of the report is again submitted to a computer for additional processing to produce the enhancement before it is sent to the output device. However, at this point, many kinds of enhancement are no longer possible since the output report does not contain the context of the data. For example, the post processor at this point would not be able to tell whether a list of dollar amounts represents income or expenses since the list headings are not output with the data in the report.

The report may also be varied in any way by reprogramming the report generator, or modifying the aplication, but that is a labor-intensive process.

SUMMARY OF THE INVENTION

The process described herein allows for the automatic creation of a number of different kinds of report enhancement by loading into the computer an enhanced report generator which will generate an enhanced report for any set of data, context and application. For example, assume that the database has, among other things, one file of employees, and another file of monthly fixed expenses. It is most likely that it would be preferable that a page containing a list of employe information would be formatted differently from a page containing a list of expenses. In this case, the two database files will have in their headings, and also in every field within the file, a context identifier. In the first case the context identifier in the heading will state that the file is a table of employees, and the fields will have identifiers stating whether the field is a list of salaries, social security numbers, department numbers, etc. Likewise, every field in the list of expenses will be identified as a dollar amount, a cost code, etc. Instead of using the standard report generator to produce a report, the data and context will be transfered to the enhanced report generator. Given the data and the context, the enhanced report generator can enhance the reports in any way that the output device can display or print. Finally, the two enhanced reports will be returned to the output side of the standard report generator, where they will be automatically sent to the output device. In this way, any one of a variety of enhanced reports can be created without reprogramming.

This system requires only that the input to the standard report generator be modified by adding instructions to allow the data and context to be transferred to the enhanced report generator for enhancement, and that the interface to the standard report generator be modified to allow it to accept back the enhanced report as its output, which will then be sent automatically to the output device. In some cases, additional contextual information will have to be added to the database if the existing contextual data is not sufficient to support the desired formats. In this way, either the standard or enhanced report generators can be used, and the entire process will appear to be standard to the host computer.

The advantage of this system is that each enhanced report formatter can have a set of rules so that the enhancement can be varied in accordance with the details of the data, context and application. For example, in a list of expenses, those over a certain dollar amount can be typed in red, and those expressed in a foreign currency can also be converted to dollar amounts by the enhanced report generator and expressed in dollar amounts in brackets. In other words, any amount of intelligence can be added, in the form of rules, to the enhanced report generator. Other features that can be added are boxes around certain data, certain parts such as titles can be in color, and the like. Of course, options can only be specified if the output device is capable of providing them. Not every output device can produce graphics, scalable fonts or color, and so the rules are always formulated with respect to a specific output device.

The rules can be thought of as being either data driven or application dirven. An example of a data driven rule would be to only print a line of data if the employee is over a certain age, while an example of an application driven rule is that all report titles pages will carry the company logo.

In the usual case, the enhanced report generators are fairly complex software routines, and will execute standard default options based on the data and context, with no programming required of the user. However, these standard defaults can be changed to some extent by the change of specific instructions as specified by the user's manual, where small changes such as type size, color and the like can be made by the user. In the alternative, a choice of defaults can be written as part of the rules into the enhanced report generator, and the user can choose one, perhaps from a menu, without application modification.

A further advantage of this system is that the enhancement software programs do not have to be written in the same language as that of the host program. For example, if the enhancement consists of adding tabular boxes within which the data is to be written, even though the host program and the standard report generator are written in COBOL, by using object oriented programming, the enhancement program can be written in a different language, such as assembly language, C++ or Smalltalk, that more efficiently lends itself to the creation of simple graphics, or one of the languages that are optimized for the control of color, if the graphics are to be printed in color. This allows a single enhanced report generator, written in one language, to be used with computers which use a number of different languages and hardware. It is because of this feature that a small number of object oriented enhancement programs can be written to cover a wide range of printing applications.

Another advantage of this system is that it allows an additional level of data security. Normally, for example, payroll data is confidential, and either a user is allowed to access the employee data file, or he is not. With this enhanced report generator, the rules can allow different categories of users to access different fractions of the total data base, ie., social security numbers may not be accessed by some users, salary may not be accessed by others.

To summarize, the process is to define the formatting rules of the enhanced report generator based on the data, context, rules and application and to put the required branch instructions in the standard report generator so that when a standard report is ordered, an enhanced report will be produced.

BRIEF DESCRIPTIONS OF THE DRAWINGS

DETAILED DESCRIPTION OF THE INVENTION

Figure 1:
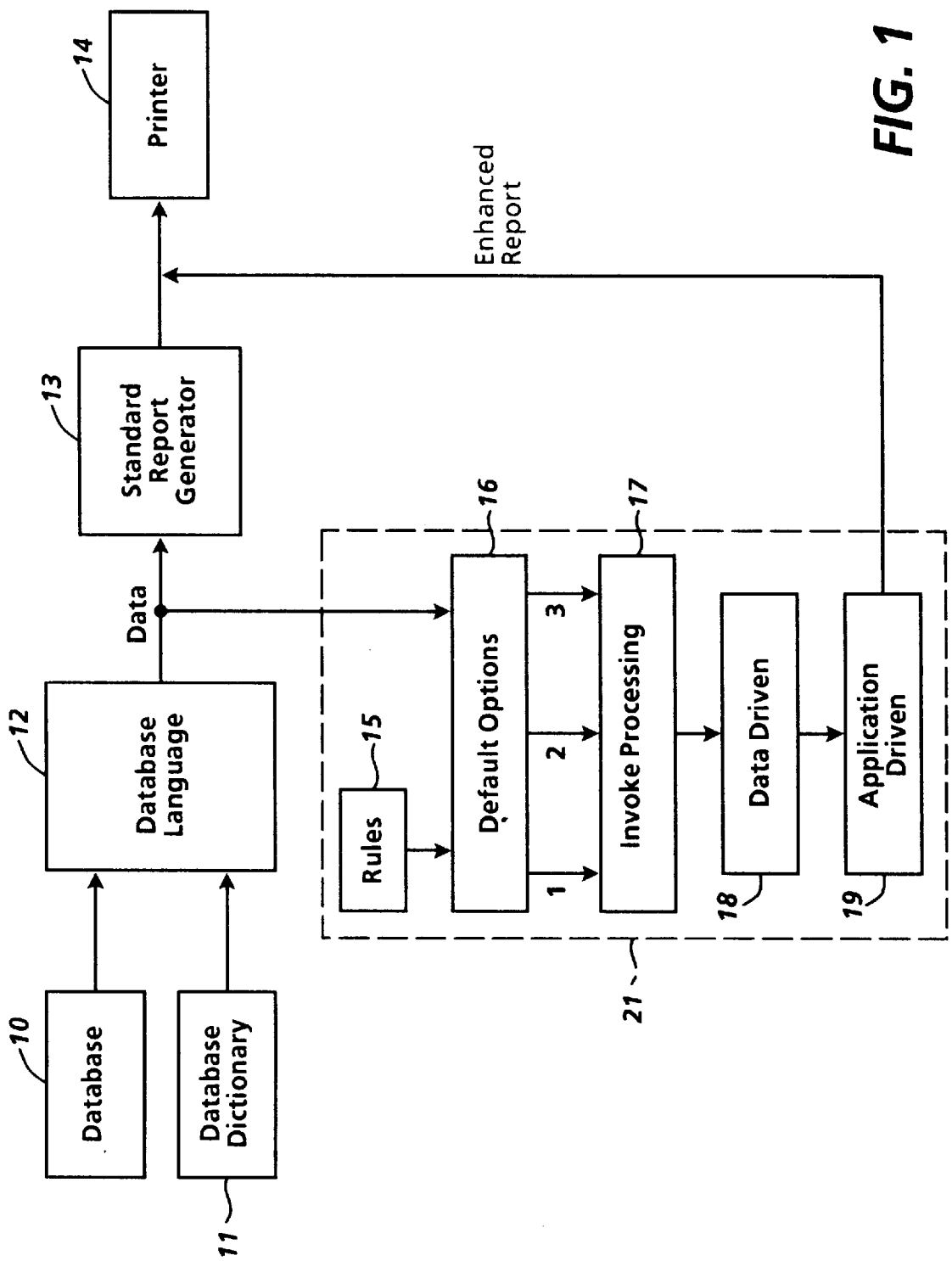
FIG. 1 is a simplified block diagram of the system.

FIG. 1 illustrates how the enhanced report generator 21 can be added to a typical printing system.

In the standard report writing process, the computer will contain a database 10, and a database management program 12 written in a database language or in a traditional computer language such as COBOL. In either case there will be a data dictionary 11, which will be well defined in the case of a database language, less well defined in the case of a traditional language. The accessed data is operated on by the standard report generator 13, which is a software package also stored in the computer. This may be written in SQL or some other data base language. The resultant report is then sent to the output device 14. To make slight modifications to the format of the printed data, either the application 12 or the report generator 13 would have to be reprogrammed. To make up entirely new formats, new application programs 12 would have to be written.

To modify this existing system to produce enhanced reports requires that there is loaded into the computer the enhanced report generator 21. There is no need to modify the standard report generator, the application-report generator interface will be modified to call the enhanced report generator as required. The users will continue to work with the standard report generator. The application report generator interface 13 is modified in two ways. First, instructions are added to send the data and the associated contexts to the enhanced report generator, and, second, to accept back the enhanced report and send it directly to the output device.

Within the enhanced report generator is a set of rules 15 for each type of enhanced report that the generator 21 is capable of producing. As explained above, the rules may be application, context or data driven. The rules and data containing the context information are tested for the appropriate default option 16, and one (of three shown in this diagram) is invoked 17. The report generator will produce some format enhancements driven by the data 18 and some that are driven by the application 19 to produce the enhanced report which is sent back directly to the output device.

A basic difference between a standard report generator and the enhanced report generator is that the former is already integrated into the database management system and is only applicable to that specific data base management system (DBMS). As such, it is a part of the DBMS. The enhanced report generator is interfaced with the DBMS at the report call level, ie., the application can choose where to send the report (standard or enhanced report generator). The enhanced report generator is also applicable to report enhancements of non-database reports such as packing instructions or mass mailing leaflets.

Thus, the user has a choice, to use either the standard report generator or the enhanced report generator. In either case the ouput of the report generator is normally fed directly to the printer. The contextual or intelligent enhancements that can be supplied to the report by the enhanced report generator are variations in fonts, color, graybar additions, and the like. These contextual inputs to the rules can be supplied by any source, including the headings in the data files, the data dictionary, or any other source. In addition, to utilize the full power of the enhanced report generator, additional contextual information may be added to the stored data along with the enhanced report writer to provide additional contextual material for the enhanced report generator rules to operate on.

Among others, these rules identify the following.

The subject matter of the data. For example, in a data base of employee information, the individual items of data would be identified as the employee name, the social security number or the job title.

The kind of report. For example, if it is a letter that is going to a customer, it must have a logo, while an internal memo would have a standard memo format.

Printer type. Each printer has its own data format and protocol which the report must conform to.

Access levels for priviledged data. That is, certain people or departments would be cleared for different levels of data confidentiality.

Standard enhancements. For example, in internal accounting documents, negative dollar amounts may always be expressed as numbers within brackets.

There is a user option that a report that has already been formatted by the standard report generator will be sent to the enhanced report generator, but this is for limited and specific processing. An example would be to change the font but leave the rest of the report in its original form. In this case the report may be sent to the enhanced report generator after it has been processed by the standard report generator.

Figure 2:
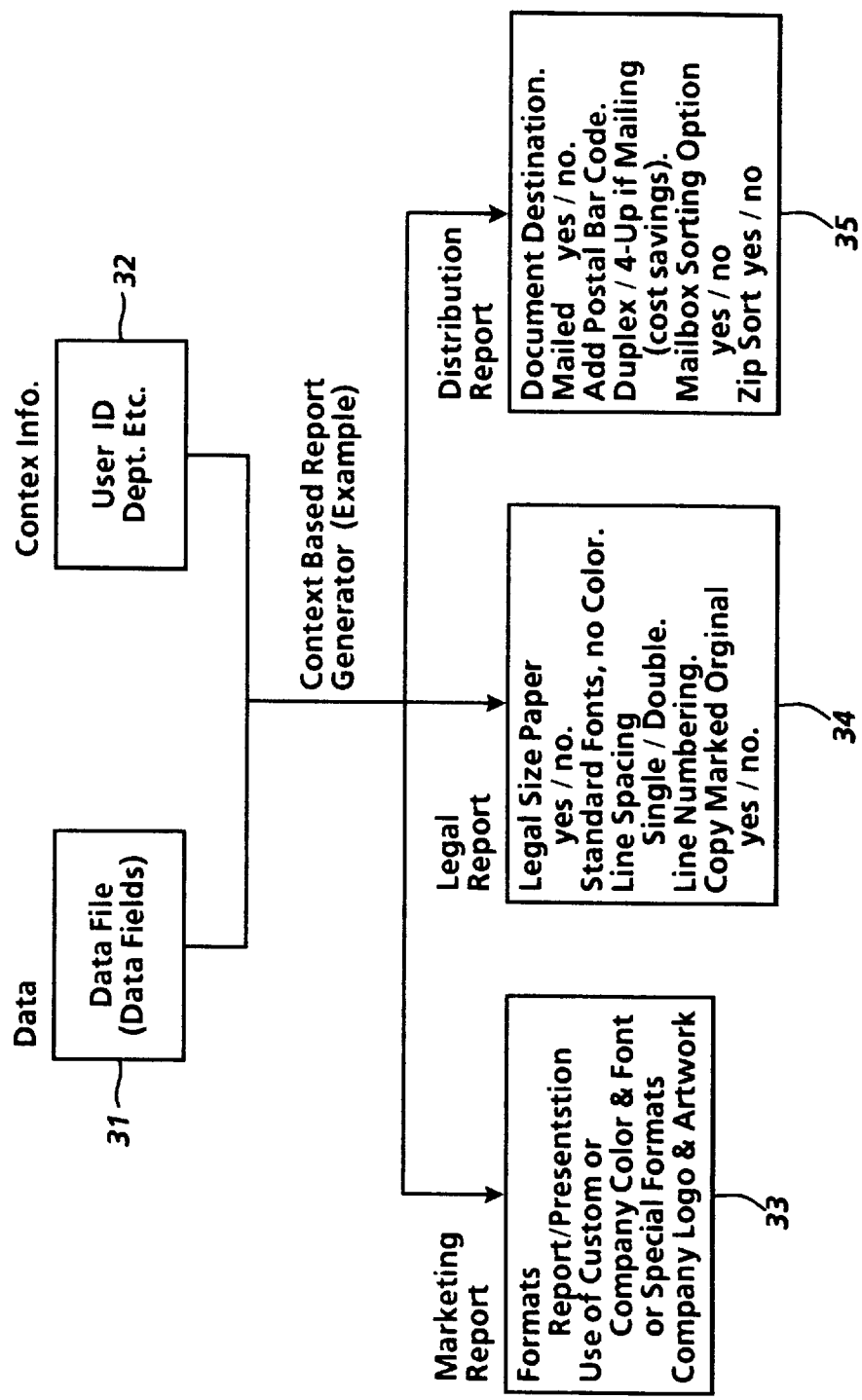
FIG. 2 is a flow chart showing how one data base can be used to generate a number of enhanced reports.

FIG. 2 shows how one set of data can be used to generate a number of different report formats. Data from the database 31 and context information 32 from any source is applied to the enhanced report generator which is shown here to have several subroutines. The first is the format for marketing 33. Here the report generator may be used to produce a report either to be read, or to be displayed, as, for example, an overhead display. If it is for a display, there would be fewer lines and bigger fonts. Each can be prepared with custom color and fonts, and special formats, all of which may contain the company logo and other artwork. If it is to be a legal report 34, it may be formatted for legal size paper and use standard fonts with no color. The line spacing must conform to the court rules, the lines of the pages are normally numbered, and the original is marked as such, with the others being labelled as copies.

The third version 35 shown here is the corporate internal version. This would be a standard format showing the document destination, whether it should be mailed in the interoffice mail system or in the Post Office. If the latter, there are possibilities of bar coding and sorting before being mailed. The bulk of the mailing may be minimized by printing in duplex or 4-up, and bar codes may be generated automatically from the zip codes. Thus, a number of different formats can be generated from the same database.

Figure 3:
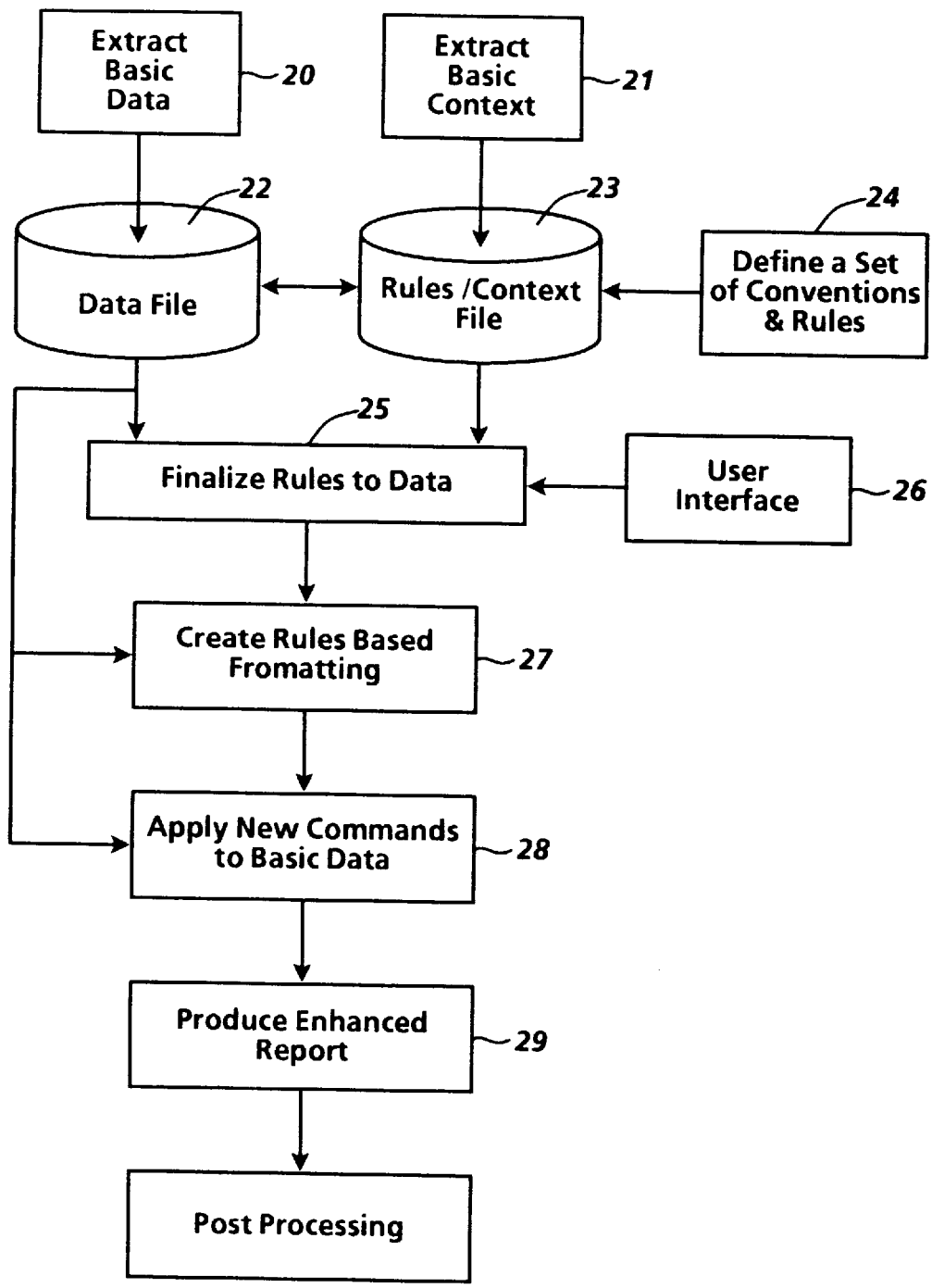
FIG. 3 is a more detailed block diagram of the enhanced report generator.

FIG. 3 shows the enhanced report generator in more detail. The data is extracted from the database at step 20, and filed in data file 22. Similarly, the corresponding contextual information is extracted either from the database, the data dictionary, or from other files in memory and stored in file 23. The data dictionary contains, among other things, attributes like the field name (e.g., employee name), field description (how packed, field length) and validity/checksum checking. Finally, the predetermined rules 24 are extracted from the host memory and also filed in file 23.

The data, rules and context are applied to the next step 25 which finalizes the rules, with or without user information 26, which is optional at this stage. That is to say, if a standard report is needed, one which uses a standard set of default rules, the rules can be used as they are. However, if the operator wants to make any additions or changes to the rules, (special document formatting, printer commands, etc) these can be added in step 26.

The resultant set of rules based on the context is then applied to step 27, where the rules may be further defined with respect to the actual data being processed. For some examples, if the data is dollar amounts, as explained above, there may be rules for expressing negative numbers, calculating foreign currencies, or printing some values in color. The ultimate set of rules is given to step 28 which uses them to process the data received form the data file 22 to produce the final enhanced report 29, which is then sent to the output device for the creation of the hard copy.

In fact, there may be optional post processing, step 30, after the final report is written. For example, the report may have a bar code which tells a post processor to sort, mail, cut, fold, bind, finish, or the like, after printing.

The standard and enhanced report generators can be contrasted as follows. To generate a standard report, a program based on SQL or 3GL is written to extract and direct data to the report generator. For example, the steps to be used to create a report of employee's salaries would contain "Employee List by Salary" as a heading, Then the fields would be filled by creating name and salary fields, getting the name and salary information from the data base, and sorting the list by salary. In the alternative, this same report could be created by using a visual report design program, which is provided with a DBMS or is provided by a third party, to lay out the report format and use that to direct data to a specific type of printer. The problem here is that any change to the report requires modifying the application or recreating the templet via a third party report writer. For example, the report generator would have to be rewritten for use with a different output device, a different color for any section of the report, different spacing between columns of the repodrt, and the like.

In this enhanced report generator, the context is used in association with the data so that the data can be enhanced in a variety of ways. An example would be that when the user logs on, and sets up the report writer, he provides his user id, department, and other information to identify who is creating the report. Then, based on the identity of the user and the data and context extracted from the host, the enhanced report writer would know that the person is in the Marketing, Legal or Distribution Department and create the report accordingly. The format would be that required of the user, including format selection, color use, font selection, company logo and other specified artwork.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. In a computer having a memory for storing programs and data, one stored program being an original report generator responsive to the data for generating an original report, the improvement comprising:

an enhanced report generator, adapted to be loaded into the memory separately, at any time, from the original report generator, and responsive to data that is not used in the original report, thus allowing changes in the appearance of the original report to generate an enhanced report.

2. The report generator of claim 1 wherein the appearance of the report comprises the color, size, arrangement or spacing of the alphanumeric content of the report, or added graphics.

3. The computer of claim 2 wherein the enhanced report generator comprises a set of rules for operating on the original report to change the appearance.

* * * * *